(12) United States Patent
Maier et al.

(10) Patent No.: US 11,230,323 B2
(45) Date of Patent: Jan. 25, 2022

(54) FASTENING MEANS

(71) Applicant: MAGNA STEYR Fahrzeugtechnik AG & Co KG, Graz (AT)

(72) Inventors: Stefan Maier, Lavamuend (AT); Juergen Taucher, Sinabelkirchen (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 311 days.

(21) Appl. No.: 16/549,035

(22) Filed: Aug. 23, 2019

(65) Prior Publication Data

US 2020/0070896 A1 Mar. 5, 2020

(30) Foreign Application Priority Data

Sep. 3, 2018 (EP) ..................................... 18192243

(51) Int. Cl.
*B62D 27/02* (2006.01)

(52) U.S. Cl.
CPC ................... *B62D 27/02* (2013.01)

(58) Field of Classification Search
CPC ............................. B62D 27/02; B62D 27/023
(Continued)

(56) References Cited

U.S. PATENT DOCUMENTS

| 6,923,484 B2* | 8/2005 | Braun ..................... B60R 19/24 293/155 |
| 9,988,093 B2* | 6/2018 | Pastrick ................. B62D 27/02 |

(Continued)

FOREIGN PATENT DOCUMENTS

| CN | 202646986 A | 1/2013 |
| CN | 103470590 A | 12/2013 |

(Continued)

OTHER PUBLICATIONS

European Search Report European Patent Application No. 18192243.6, dated Mar. 19, 2019, 4 pages.

(Continued)

*Primary Examiner* — Joseph D. Pape
(74) *Attorney, Agent, or Firm* — Jordan IP Law, LLC; Todd A. Vaughn

(57) ABSTRACT

A device for fastening a first motor vehicle component to a second motor vehicle component. The device includes a first connection piece and a second connection piece. The first connection piece has a first component fastening surface for fastening to the first motor vehicle component, a first connection piece fastening surface which is perpendicular to the first component fastening surface, and first reinforcing surfaces which each connect a lateral end edge of the first component fastening surface to a lateral end edge of the first connection piece fastening surface. The second connection piece includes a second component fastening surface for fastening to the second motor vehicle component, a second connection piece fastening surface which is perpendicular to the second component fastening surface, and second reinforcing surfaces which each connect a lateral end edge of the second component fastening surface to a lateral end edge of the second connection piece fastening surface. The first connection piece and the second connection piece are connected to each other at an interface between the first connection piece fastening surface and the second connection piece fastening surface.

20 Claims, 4 Drawing Sheets

(58) Field of Classification Search
USPC .......................................................... 296/29
See application file for complete search history.

(56) References Cited

U.S. PATENT DOCUMENTS

| | | | |
|---|---|---|---|
| 10,326,237 B1 * | 6/2019 | Campos | ........... H01R 13/62938 |
| 2009/0102238 A1 | 4/2009 | Gomi | |

FOREIGN PATENT DOCUMENTS

| | | |
|---|---|---|
| CN | 203477680 A | 3/2014 |
| DE | 10022360 A1 | 11/2001 |
| DE | 10329017 A1 | 1/2005 |
| EP | 2236395 A1 | 10/2010 |
| JP | S5023717 Y1 | 7/1975 |

OTHER PUBLICATIONS

Chinese Search Report, Chinese Patent Application No. 201910821988.0 (dated Jul. 21, 2021).

Chinese Search Report, Chinese Patent Application No. 201910821988.0 (dated Dec. 2, 2020).

* cited by examiner

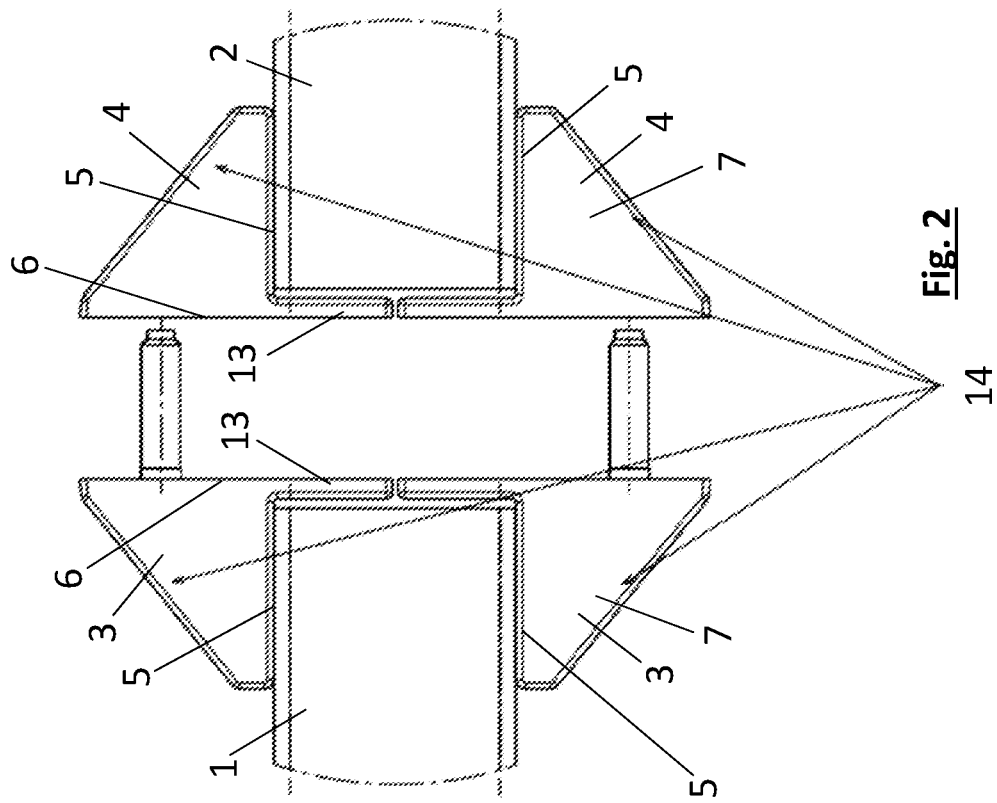
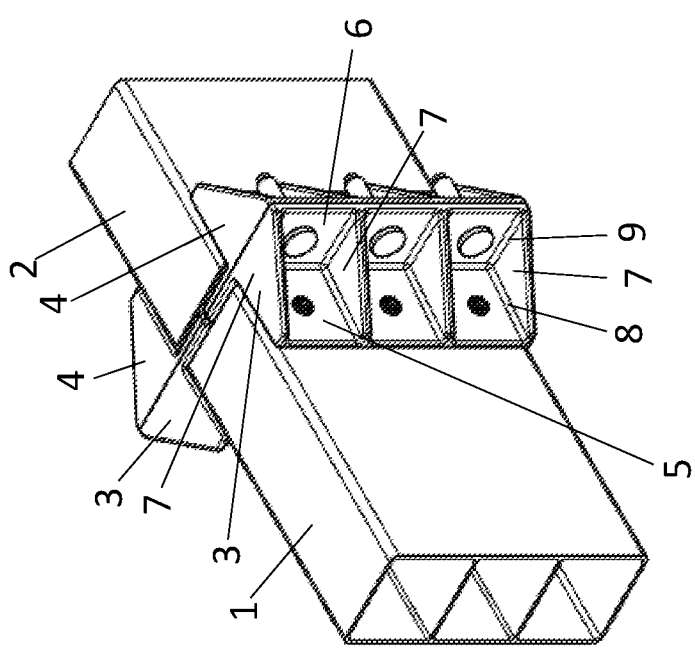

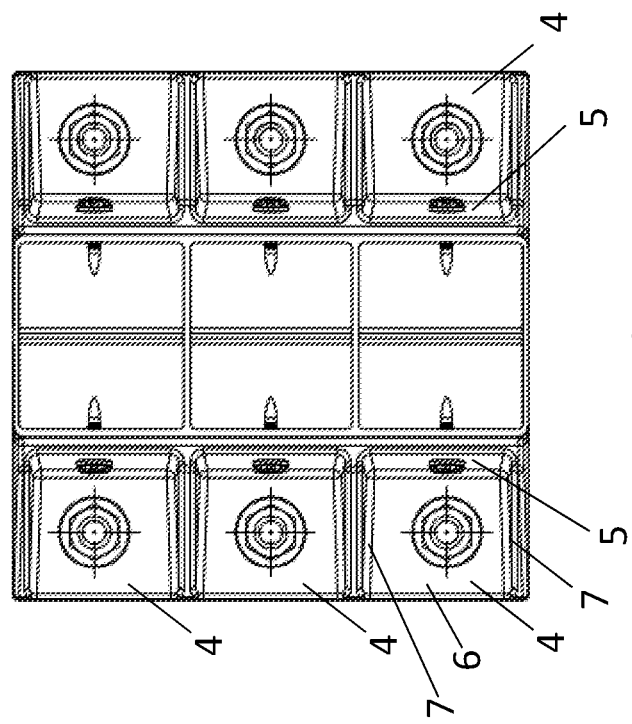
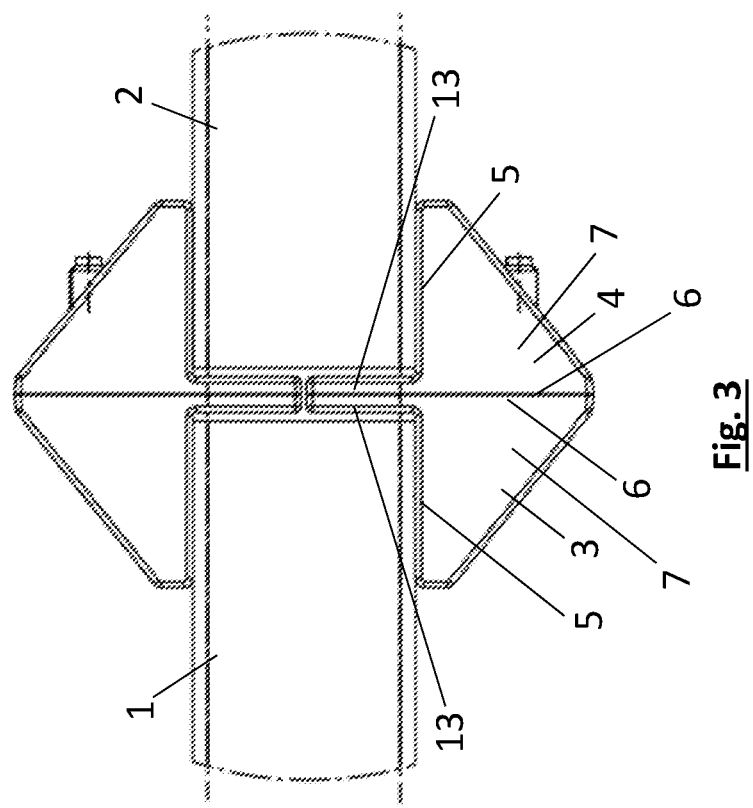

FASTENING MEANS

CROSS-REFERENCE TO RELATED APPLICATIONS

The present application claims priority 35 U.S.C. § 119 to European Patent Publication No. EP 18192243.6 (filed on Sep. 3, 2018), which is hereby incorporated by reference in its complete entirety.

TECHNICAL FIELD

Embodiments relate to a fastening device for fastening a first component to a second component, and particularly, for fastening two body shell modules in the manufacture of a motor vehicle. Embodiments also relate to a component assembly comprising a first component, a second component, and a fastening device for fastening the first component to the second component.

BACKGROUND

In the case of traditional car bodies, fixed body shell connection techniques such as welding or gluing and riveting, for example, are used to connect main modules of the car body like the front end, cabin and rear module to one another. Screwed solutions, such as those that can be used for fastening a front end module, for example, are implemented using elaborate, component-specific brackets as auxiliary means.

The construction of adequately fixed connections in the car body shell is therefore time-consuming and costly. The use of connection pieces has hitherto been limited to special regions of the body or certain connection piece formations.

By way of example, German Patent Publication No. DE 103 29 017 A1 discloses a support structure made up of interconnected profile parts, in particular for body superstructures of vehicles, having substantially rectangular hollow profiles which are connected at at least one junction by a non-thermal joining connection, wherein the joining connection is a flat adhesive connection and wherein the profile parts lie directly against one another and are shaped to form flat adhesive surfaces and correspond to one another, at least at the junction, via which the profile parts can be directly or indirectly adhered to one another in such a manner that a cross-part mechanical torque support is created between the profile parts at the junction by the adhesive connection.

SUMMARY

A technical problem addressed by embodiments is that of specifying a fastening device for fastening a first component to a second component, and particularly, for fastening two body shell modules in the manufacture of a motor vehicle which facilitates an adequately strong fastening. Such a fastening device may be produced in a particularly cost-effective and efficient manner.

Another technical problem addressed by embodiments is also that of specifying a component assembly comprising a first component, a second component and a cost-effective, efficient fastening device for fastening the first component to the second component.

The problem is solved, in accordance with embodiments, by a fastening device for fastening a first component to a second component, in particular for fastening two body shell modules in motor vehicle manufacture, comprising a first and a second connection piece, wherein the first connection piece and the second connection piece each comprise: a component fastening surface, a connection piece fastening surface which is perpendicular to the component fastening surface and at least one, preferably two, lateral reinforcing surfaces which each connect a lateral end edge of the component fastening surface to a lateral end edge of the connection piece fastening surface, wherein the component fastening surface of the first connection piece is fastened to the first component, wherein the component fastening surface of the second connection piece is fastened to the second component, wherein the connection piece fastening surface of the first connection piece is fastened to the connection piece fastening surface of the second connection piece.

In accordance with embodiments, two adapter brackets, namely the first and second connection piece, are specified which have a very simple design and interact with one another in order to fasten components to one another. The connection pieces can be used at different positions in a vehicle, in particular for the longitudinal connection of two profile parts or profile ends of modules. On account of their simple design, the connection pieces can be produced in a cost-saving manner as common parts.

Advantageously, such embodiments described herein are such that, during the manufacture of a motor vehicle, smaller prefabricated modules can be assembled later in the assembly process and do not have to pass through the entire process chain; for joining, for example, only after a painting process. If individual modules have to be replaced following the vehicle manufacture, either because a repair is needed or at the request of the customer, this can be achieved easily and cost-effectively for modules connected via a fastening device set forth in accordance with embodiments.

In accordance with embodiments, the connection pieces can be used in such a manner that initially there is a screw connection to the connection piece fastening surfaces in the X-direction of the vehicle, with the possibility of tolerance compensation in the Y and Z directions of the vehicle.

In accordance with embodiments, the component fastening surface of the first connection piece is preferably screwed and/or riveted and/or welded and/or adhered to the first component and/or the component fastening surface of the second connection piece to the second component. These surfaces may also be mechanically, thermally, or chemically connected in other ways known in the art. It is particularly preferable, however, for surfaces to be screwed and therefore also to be detachable subsequently. In another embodiment, the surfaces are adhered and screwed, for example flow-drill screwed (FDS), in other words via flow-drill screws.

In accordance with embodiments, the connection piece fastening surface of the first connection piece is preferably screwed and/or riveted and/or welded and/or adhered to the connection piece fastening surface of the second connection piece. As described previously for the component fastening surfaces, the connection piece fastening surfaces can also be connected mechanically, thermally, or chemically in other ways known in the art. Particularly preferably, however, the surfaces are screwed or adhered and screwed, for example flow-drill screwed (FDS), in other words via flow-drill screws.

In accordance with embodiments, the connection piece fastening surface of the first connection piece to the connection piece fastening surface of the second connection piece is preferably screwed in such a manner that a head of a screw lies adjacent to the connection piece fastening surface of the first connection piece and an end face of a nut to the connection piece fastening surface of the second connection piece. The screw in this case is screwed into the nut, so that both connection piece fastening surfaces are clamped between the screw head and nut. Alternatively, or in addition, flow-drill screws can also be used which do not usually have a nut.

In accordance with embodiments, the reinforcing surfaces are preferably triangular. An end edge of the reinforcing surface may extend from the end of the end edge of the component fastening surface to the end of the end edge of the connection piece fastening surface.

In accordance with embodiments, the reinforcing surfaces are preferably each perpendicular to the component fastening surface and to the connection piece fastening surface.

In accordance with embodiments, preferably the first connection piece and the second connection piece each have an extension surface that essentially forms a prolongation of the connection piece fastening surface which extends beyond the component fastening surface of the connection piece. In that way, when the connection pieces are used, the extension surface is located between the first component and the second component.

In accordance with embodiments, the first connection piece and the second connection piece preferably take the shape of common parts.

In accordance with embodiments, a component assembly may comprise a first component such as a first motor vehicle shell module; a second component such as a second motor vehicle shell module; and at least one fastening device as previously described herein, the fastening surface of the first connection piece being fastened to the first component, and the fastening surface of the second connection piece being fastened to the second component, wherein the connection piece fastening surface of the first connection piece is fastened to the connection piece fastening surface of the second connection piece. In this way, the first component and the second component are ultimately fastened or connected to one another.

In accordance with embodiments, where necessary, the extension surface is preferably located between the first and second component. In particular, the extension surface may be clamped between an end face of the first component and an end face of the second component. Via the extension surface, the two components can be positioned axially to one another.

In accordance with embodiments, at least two fastening devices are preferably arranged opposite one another, so that the fastening surfaces of the opposite connection pieces are facing one another, wherein the first component and the second component are arranged between the fastening surfaces of the connection pieces lying opposite one another.

In accordance with embodiments, at least two or also more fastening devices are preferably arranged side by side, in particular, such that lateral reinforcing surfaces of two connection pieces are each adjacent to one another. Multiple connection pieces, in particular, configured as common parts, can therefore be used in combination with one another, lined up alongside one another, in order to create a particularly strong connection.

In accordance with embodiments, a device for fastening a first body shell module and a second body shell module of a motor vehicle may comprise at least one of the following: a first connection piece that includes a first component fastening surface for fastening to the first body shell module, a first connection piece fastening surface which is perpendicular to the first component fastening surface, and first reinforcing surfaces which each connect a lateral end edge of the first component fastening surface to a lateral end edge of the first connection piece fastening surface; and a second connection piece that includes a second component fastening surface for fastening to the second body shell module, a second connection piece fastening surface which is perpendicular to the second component fastening surface, and second reinforcing surfaces which each connect a lateral end edge of the second component fastening surface to a lateral end edge of the second connection piece fastening surface, wherein the first connection piece and the second connection piece are connected to each other at an interface between the first connection piece fastening surface and the second connection piece fastening surface.

In accordance with embodiments, an assembly for a motor vehicle may comprise at least one of the following: a first body shell module; a second body shell module; and at least one fastening device to fasten the first body shell module and the second body shell module, the at least one fastening device including: a first connection piece that includes a first component fastening surface for fastening to the first body shell module, a first connection piece fastening surface which is perpendicular to the first component fastening surface, and first reinforcing surfaces which each connect a lateral end edge of the first component fastening surface to a lateral end edge of the first connection piece fastening surface; and a second connection piece that includes a second component fastening surface for fastening to the second body shell module, a second connection piece fastening surface which is perpendicular to the second component fastening surface, and second reinforcing surfaces which each connect a lateral end edge of the second component fastening surface to a lateral end edge of the second connection piece fastening surface, wherein the first connection piece and the second connection piece are connected to each other at an interface between the first connection piece fastening surface and the second connection piece fastening surface.

In accordance with embodiments, a motor vehicle may comprise at least one of the following: a first body shell module; a second body shell module; and at least one fastening device to fasten the first body shell module and the second body shell module, the at least one fastening device including: a first connection piece that includes a first component fastening surface for fastening to the first body shell module, a first connection piece fastening surface which is perpendicular to the first component fastening surface, and first reinforcing surfaces which each connect a lateral end edge of the first component fastening surface to a lateral end edge of the first connection piece fastening surface; and a second connection piece that includes a second component fastening surface for fastening to the second body shell module, a second connection piece fastening surface which is perpendicular to the second component fastening surface, and second reinforcing surfaces which each connect a lateral end edge of the second component fastening surface to a lateral end edge of the second connection piece fastening surface, wherein the first connection piece and the second connection piece are connected to each other at an interface between the first connection piece fastening surface and the second connection piece fastening surface.

DRAWINGS

Embodiments will be illustrated by way of example in the drawings and explained in the description below.

FIG. 1 illustrates a three-dimensional depiction of a component assembly comprising three fastening devices on each of two sides of the component assembly, in accordance with embodiments.

FIG. 2 illustrates a top view of the component assembly of FIG. 1 prior to connection of the connection pieces.

FIG. 3 illustrates a top view of the component assembly of FIG. 1 after the connection pieces have been connected.

FIG. 4 illustrates a front view of the component assembly of FIG. 1.

DESCRIPTION

Figure 5:
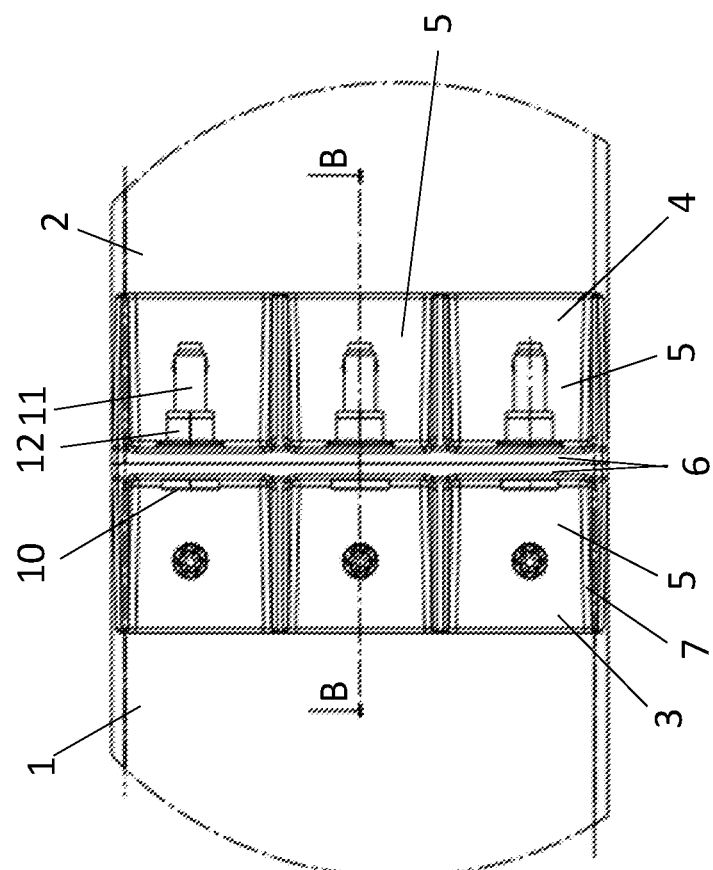
FIG. 5 illustrates a side view of the component assembly of FIG. 1.

A component assembly according to the invention is illustrated in FIGS. 1-7, comprising three fastening devices side by side on each of two opposite sides of the component assembly, in other words six fastening devices in total.

The component assembly comprises a first component 1, namely, a rectangular profile of a motor vehicle body shell, and a second component 2, namely an identically designed rectangular profile of a second motor vehicle body shell. In accordance with embodiments, the first component 1 and the second component 2 are indirectly fastened to one another via triangular connection pieces 3, 4. For this purpose, the first connection piece 3 and the second connection piece 4 are each fastened firstly to a respective component (i.e., the first connection piece 3 to the a first component 1, and the second connection piece 4 to the second component 2), and then secondly to one another. In that way, the first connection piece 3 and the second connection piece 4 collectively form a fastening device for fastening the first component 1 to the second component 2.

As illustrated in FIG. 1, the first connection piece 3 and the second connection piece 4 each comprise a component fastening surface 5, a connection piece fastening surface 6 which is perpendicular to the component fastening surface 5, and two lateral reinforcing surfaces 7 which each connect a lateral end edge 8 of the component fastening surface 5 to a lateral end edge 9 of the connection piece fastening surface 6. The reinforcing surfaces 7 are each triangular in shape/cross-section and are each perpendicular to the component fastening surface 5 and to the connection piece fastening surface 6. The first connection piece 3 and the second connection piece 4 therefore have a substantially triangular form, such as, for example, when viewed from the side.

The component fastening surface 5 of the first connection piece 3 is fastened to the first component 1, whereas the component fastening surface 5 of the second connection piece 4 is fastened to the second component 2. The connection piece fastening surface 6 of the first connection piece 3 is fastened to the connection piece fastening surface 6 of the second connection piece 4.

In particular, the component fastening surfaces 5 are screwed to the respective component 1, 2, preferably via flow-drill screws. These fastening surfaces are preferably glued in addition.

Figure 7:
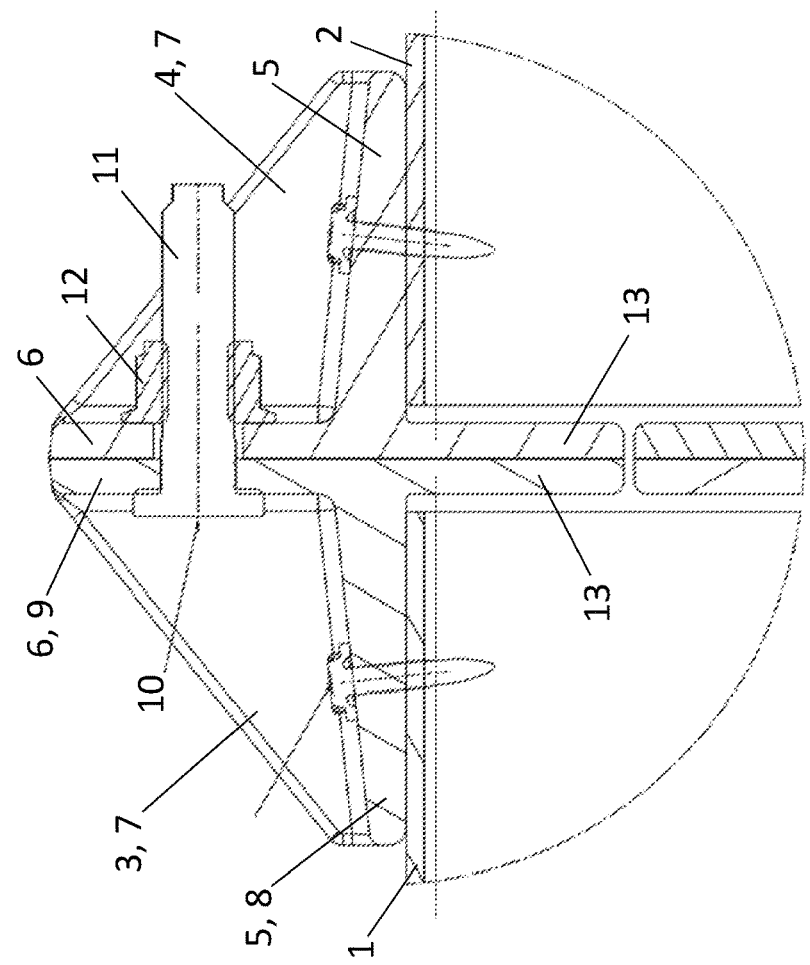
FIG. 7 illustrates a partial representation of the fastening device of the detail A in FIG. 6.

As illustrated in FIGS. 5 and 7, the connection piece fastening surfaces 6 are each screwed to one another. The connection piece fastening surface 6 of the first connection piece 3 is screwed to the connection piece fastening surface 6 of the second connection piece 4, wherein a head 10 of a screw 11 is adjacent to and directly contacting the connection piece fastening surface 6 of the first connection piece 3 and an end face of a nut 12 is adjacent to and directly contacting the connection piece fastening surface 6 of the second connection piece 4. In particular, a press-in screw can be used as the screw 11, so as to represent, along with a nut 12, a detachable connection of the connection piece fastening surfaces 6.

Figure 6:
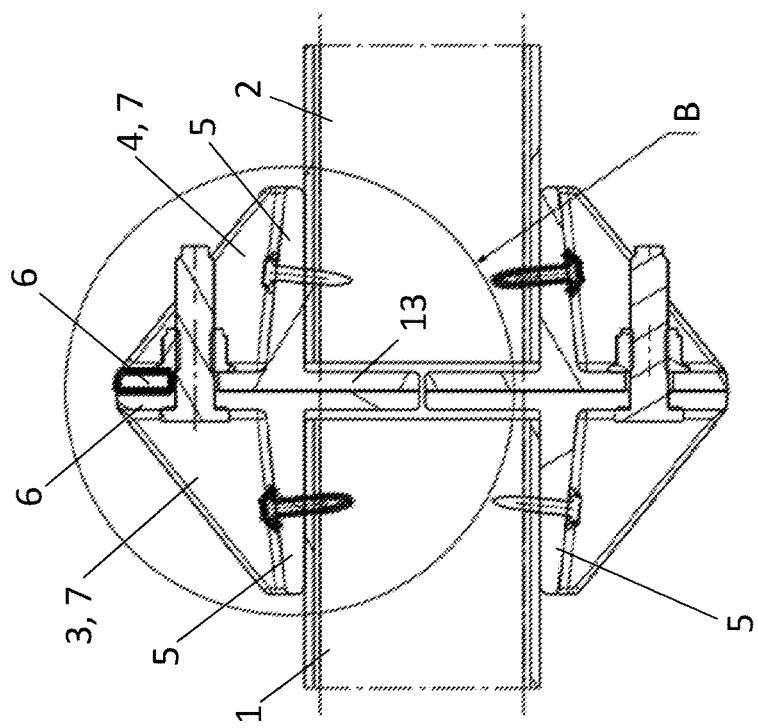
FIG. 6 illustrates a top, sectional view of the component assembly of FIG. 1, so in the line of sight of FIG. 3, corresponding to section B-B of FIG. 5.

As illustrated in FIGS. 6 and 7, the first connection piece 3 and the second connection piece 4 each have an extension surface 13, in addition to their triangular shape. The extension surface 13 substantially forms a prolongation of the connection piece fastening surface 6 which extends beyond the component fastening surface 5 of the first connection piece 3 and the second connection piece 4, respectively. The extension surface 13 of the first connection piece 3 and the second connection piece 4 in each case is arranged between the first component 1 and the second component 2, so that an end face abutment for the profiles or the first component 1 and the second component 2 is formed by the extensions 13. The extension surface 13 in each case is clamped between an end face of the first component 1 and an end face of the second component 2. The extension surfaces 13 therefore also create a fixed distance between the first component 1 and the second component 2.

As illustrated in FIG. 1, for example, three fastening devices are firstly arranged side by side, so that the lateral reinforcing surfaces 7 of the first connection piece 3 and the second connection piece 4 each lie alongside one another. In the illustrated embodiment, the first connection piece 3 and the second connection piece 4 thereby cover the entire height of the first component 1 and the second component 2.

As also illustrated in FIGS. 1 and 2, the two fastening devices are arranged opposite one another in each case, so that the fastening surfaces 5 of the first connection piece 3 and the oppositely arranged second connection piece 4 face one other. In that way, the first component 1 and the second component 2 are arranged between the fastening surfaces 5 of the first connection piece 3 and the second connection piece 4 which lay opposite one another. Over the entire height of the profiles or the first component 1 and the second component 2, the fastening devices which are opposite one another in each case or first connection pieces 3 in each case are therefore arranged opposite first connection pieces 3 and second connection pieces 4 opposite second connection pieces 4, so that the first component 1 and the second component 2 are fastened, in particular, mechanically screwed, flow-drill screwed and/or glued, between the fastening surfaces 5 of the first or second connection pieces in each case.

As illustrated in FIG. 2, all first connection pieces 3 and second connection pieces 4 used are configured as common parts 14, and can, therefore, be produced particularly efficiently and cost-effectively.

The terms "coupled," "attached," "fastened," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 first component
2 second component
3 first connection piece
4 second connection piece
5 component fastening surface
6 connection piece fastening surface
7 reinforcing surface
8 end edge of the component fastening surface
9 end edge of the connection piece fastening surface
10 head
11 screw
12 nut
13 extension surface
14 common parts

What is claimed is:

1. A device for fastening a first body shell module and a second body shell module of a motor vehicle, the device comprising:
   a first connection piece that includes a first single component fastening surface that solely fastens the first connection piece to the first body shell module, a first connection piece fastening surface which is perpendicular to the first component fastening surface, and first reinforcing surfaces which each connect a lateral end edge of the first single component fastening surface to a lateral end edge of the first connection piece fastening surface; and
   a second connection piece that includes a second single component fastening surface that solely fastens the second connection piece to the second body shell module, a second connection piece fastening surface which is perpendicular to the second component fastening surface, and second reinforcing surfaces which each connect a lateral end edge of the second single component fastening surface to a lateral end edge of the second connection piece fastening surface;
   wherein the first connection piece and the second connection piece are connected to each other at an interface between the first connection piece fastening surface and the second connection piece fastening surface.

2. The device of claim 1, wherein:
   the first connection piece and the first body shell module are connected to each other by a mechanical connection, and/or a weld connection, and/or an adhesive connection at an interface between the first single component fastening surface and a sidewall of the first body shell module; and
   the second connection piece and the second body shell module are connected to each other by a mechanical connection, and/or a weld connection, and/or an adhesive connection at an interface between the second single component fastening surface and a sidewall of the second body shell module.

3. The device of claim 1, wherein the first connection piece and the second connection piece are connected to each other by a mechanical connection, and/or a weld connection, and/or an adhesive connection at the interface between the first connection piece fastening surface and the second connection piece fastening surface.

4. The device of claim 1, wherein the first connection piece fastening surface is fastened via a screw connection to the second connection piece fastening surface, such that a head of a screw is adjacent to and directly contacting the first connection piece fastening surface and an end face of a nut is adjacent to and directly contacting the second connection piece fastening surface.

5. The device of claim 1, wherein:
   the first reinforcing surfaces each have a triangular cross-section in shape and/or are each perpendicular to the first single component fastening surface and the first connection piece fastening surface; and
   the second reinforcing surfaces each have a triangular cross-section in shape and/or are each perpendicular to the second single component fastening surface and the second connection piece fastening surface.

6. The device of claim 1, wherein:
   the first connection piece has a first extension surface which forms a prolongation of the first connection piece fastening surface which extends beyond the first single component fastening surface in a manner such that, in an operating state of the device, the first extension surface is clamped between an end face of the first body shell module and an end face of the second body shell module; and
   the second connection piece has a second extension surface which forms a prolongation of the second connection piece fastening surface which extends beyond the second single component fastening surface in a manner such that, in an operating state of the device, the second extension surface is clamped between an end face of the first body shell module and an end face of the second body shell module.

7. The device of claim 1, wherein in an operating state of the device:
   the first single component fastening surface lies on a sidewall of the first body shell module;
   the second single component fastening surface lies on a sidewall of the second body shell module;
   a first extension surface of the first connection piece is clamped between an end face of the first body shell module and an end face of the second body shell module; and
   a second extension surface of the second connection piece is clamped between an end face of the first body shell module and an end face of the second body shell module.

8. The device of claim 1, wherein in an operating state of the device:
   the first single component fastening surface lies on a sidewall of the first body shell module, and the second single component fastening surface lies on a sidewall of the second body shell module in substantially the same plane as the first component fastening surface; and
   a first extension surface of the first connection piece extends between an end face of the first body shell module and an end face of the second body shell module, and a second extension surface of the second connection piece extends between an end face of the first body shell module and an end face of the second body shell module in parallel to the first extension surface.

9. The device of claim 1, wherein the first connection piece and the second connection piece are common parts.

10. An assembly for a motor vehicle, the assembly comprising:
    a first body shell module;

a second body shell module; and
at least one fastening device to fasten the first body shell module and the second body shell module, the at least one fastening device including:
a first connection piece that includes a first single component fastening surface that solely fastens the first connection piece to the first body shell module, a first connection piece fastening surface which is perpendicular to the first component fastening surface, and first reinforcing surfaces which each connect a lateral end edge of the first single component fastening surface to a lateral end edge of the first connection piece fastening surface; and
a second connection piece that includes a second single component fastening surface that solely fastens the second connection piece to the second body shell module, a second connection piece fastening surface which is perpendicular to the second component fastening surface, and second reinforcing surfaces which each connect a lateral end edge of the second single component fastening surface to a lateral end edge of the second connection piece fastening surface,
wherein the first connection piece and the second connection piece are connected to each other at an interface between the first connection piece fastening surface and the second connection piece fastening surface.

11. The assembly of claim 10, wherein:
the first connection piece and the first body shell module are connected to each other by a mechanical connection, and/or a weld connection, and/or an adhesive connection at an interface between the first single component fastening surface and a sidewall of the first body shell module; and
the second connection piece and the second body shell module are connected to each other by a mechanical connection, and/or a weld connection, and/or an adhesive connection at an interface between the second single component fastening surface and a sidewall of the second body shell module.

12. The assembly of claim 10, wherein the first connection piece and the second connection piece are connected to each other by a mechanical connection, and/or a weld connection, and/or an adhesive connection at the interface between the first connection piece fastening surface and the second connection piece fastening surface.

13. The assembly of claim 10, wherein the first connection piece fastening surface is fastened via a screw connection to the second connection piece fastening surface, such that a head of a screw is adjacent to and directly contacting the first connection piece fastening surface and an end face of a nut is adjacent to and directly contacting the second connection piece fastening surface.

14. The assembly of claim 10, wherein:
the first reinforcing surfaces each have a triangular cross-section in shape and/or are each perpendicular to the first single component fastening surface and the first connection piece fastening surface; and
the second reinforcing surfaces each have a triangular cross-section in shape and/or are each perpendicular to the second single component fastening surface and the second connection piece fastening surface.

15. The assembly of claim 10, wherein:
the first connection piece has a first extension surface which forms a prolongation of the first connection piece fastening surface which extends beyond the first single component fastening surface in a manner such that, in an operating state of the assembly, the first extension surface is clamped between an end face of the first body shell module and an end face of the second body shell module; and
the second connection piece has a second extension surface which forms a prolongation of the second connection piece fastening surface which extends beyond the second single component fastening surface in a manner such that, in an operating state of the assembly, the second extension surface is clamped between an end face of the first body shell module and an end face of the second body shell module.

16. The assembly of claim 10, wherein in an operating state of the assembly:
the first single component fastening surface lies on a sidewall of the first body shell module;
the second single component fastening surface lies on a sidewall of the second body shell module;
the first extension surface is clamped between an end face of the first body shell module and an end face of the second body shell module; and
the second extension surface is clamped between an end face of the first body shell module and an end face of the second body shell module.

17. The assembly of claim 10, wherein in an operating state of the assembly:
the first single component fastening surface lies on a sidewall of the first body shell module, and the second single component fastening surface lies on a sidewall of the second body shell module in substantially the same plane as the first component fastening surface; and
a first extension surface of the first connection piece extends between an end face of the first body shell module and an end face of the second body shell module, and a second extension surface of the second connection piece extends between an end face of the first body shell module and an end face of the second body shell module in parallel to the first extension surface.

18. The assembly of claim 10, wherein the first connection piece and the second connection piece are common parts.

19. A motor vehicle, comprising:
a first body shell module;
a second body shell module; and
at least one fastening device to fasten the first body shell module and the second body shell module, the at least one fastening device including:
a first connection piece that includes a first single component fastening surface that solely fastens the first connection piece to the first body shell module, a first connection piece fastening surface which is perpendicular to the first component fastening surface, and first reinforcing surfaces which each connect a lateral end edge of the first single component fastening surface to a lateral end edge of the first connection piece fastening surface; and
a second connection piece that includes a second single component fastening surface that solely fastens the second connection piece to the second body shell module, a second connection piece fastening surface which is perpendicular to the second component fastening surface, and second reinforcing surfaces which each connect a lateral end edge of the second single component fastening surface to a lateral end edge of the second connection piece fastening surface, wherein the first connection piece and the second connection piece are connected to each other at an interface between the first connection piece fastening surface and the second connection piece fastening surface.

20. The motor vehicle of claim 19, wherein in an operating state of the at least one fastening device:
the first single component fastening surface lies on a sidewall of the first body shell module, and the second single component fastening surface lies on a sidewall of the second body shell module in substantially the same plane as the first component fastening surface; and
a first extension surface of the first connection piece extends between an end face of the first body shell module and an end face of the second body shell module, and a second extension surface of the second connection piece extends between an end face of the first body shell module and an end face of the second body shell module in parallel to the first extension surface.

* * * * *